United States Patent
Fok Ah Chuen et al.

(10) Patent No.: US 8,879,421 B2
(45) Date of Patent: Nov. 4, 2014

(54) METHOD FOR PERSONAL NETWORK SERVICE CONFIGURATION AND SYSTEM FOR PERSONAL NETWORK SERVICE CONFIGURATION

(75) Inventors: Frederic Fok Ah Chuen, Berkshire (GB); Vincent Roger, Berkshire (GB)

(73) Assignee: NEC Corporation, Tokyo (JP)

(*) Notice: Subject to any disclaimer, the term of this patent is extended or adjusted under 35 U.S.C. 154(b) by 68 days.

(21) Appl. No.: 13/059,290

(22) PCT Filed: Jun. 26, 2009

(86) PCT No.: PCT/JP2009/062157
§ 371 (c)(1),
(2), (4) Date: Feb. 16, 2011

(87) PCT Pub. No.: WO2010/032535
PCT Pub. Date: Mar. 25, 2010

(65) Prior Publication Data
US 2011/0149802 A1    Jun. 23, 2011

(30) Foreign Application Priority Data

Sep. 19, 2008  (EP) .................................. 08164679

(51) Int. Cl.
*H04W 40/00*   (2009.01)
*H04L 29/08*   (2006.01)
*H04W 12/08*   (2009.01)

(52) U.S. Cl.
CPC .............. *H04L 67/34* (2013.01); *H04L 67/306* (2013.01); *H04W 12/08* (2013.01); *H04L 67/2814* (2013.01)
USPC ......... 370/254; 370/310.2; 370/328; 370/338

(58) Field of Classification Search
CPC ... H04L 12/54; H04L 12/56; H04L 12/54689; H04L 29/08; H04W 4/00; H04M 3/42
USPC .............. 370/254, 310.2, 328, 338, 310, 392; 455/418–422.1, 432.1–455, 415, 455/402.1, 414.1, 406, 410
See application file for complete search history.

(56) References Cited

U.S. PATENT DOCUMENTS 5,890,054 A * 3/1999 Logsdon et al. ............. 455/11.1
7,480,254 B2 * 1/2009 Mayer .......................... 370/254
(Continued)

FOREIGN PATENT DOCUMENTS

| JP | 2004-304623 | 10/2004 |
| WO | 2007/091699 | 8/2007 |
| WO | 2008/072488 | 6/2008 |

OTHER PUBLICATIONS

Jeff Bernstein—Technical Report—DSL Forum TR-069—CPE WAN Management Protocol—May 2004—pp. 1-109.

(Continued)

*Primary Examiner* — Dang Ton
*Assistant Examiner* — Sai Aung
(74) *Attorney, Agent, or Firm* — Young & Thompson (57) ABSTRACT

An invention concerns a method for enabling Service configuration by a plurality of Personal Network Entities connected to a Personal Network comprising a Personal Network Application Server accessible via IP Multimedia Subsystem domain, a primary Personal Network Entity holding a subscription to control the Personal Network and a plurality of secondary Personal Network Entities controlled by the primary Personal Network Entity, the method comprising the following steps: —associating to each PNE configuration rights describing the services to be configured by each of the PNE, —storing the PNE identities, and configuration rights associated to each PNE in a Configuration Element (PN-RCE), —sending to the PN Application Server (AS) a configuration request based on the stored configuration rights.

20 Claims, 4 Drawing Sheets

(56) References Cited

U.S. PATENT DOCUMENTS

| | | | |
|---|---|---|---|
| 7,499,704 B1* | 3/2009 | Bonner | 455/435.1 |
| 7,606,559 B2* | 10/2009 | Aarnio et al. | 455/411 |
| 7,710,950 B2* | 5/2010 | Buckley et al. | 370/354 |
| 7,764,946 B1* | 7/2010 | Sennett et al. | 455/404.1 |
| 7,801,158 B2* | 9/2010 | Voit et al. | 370/401 |
| 7,839,856 B2* | 11/2010 | Sinha et al. | 370/392 |
| 7,864,673 B2* | 1/2011 | Bonner | 370/230 |
| 7,907,578 B2* | 3/2011 | Harvey et al. | 370/338 |
| 8,081,610 B2* | 12/2011 | Stirbu et al. | 370/338 |
| 8,121,089 B2* | 2/2012 | Bao et al. | 370/331 |
| 8,175,236 B2* | 5/2012 | Pandey et al. | 379/114.2 |
| 8,180,375 B2* | 5/2012 | Awad | 455/456.3 |
| 8,204,502 B2* | 6/2012 | Khetawat et al. | 455/436 |
| 8,223,717 B2* | 7/2012 | Dillon et al. | 370/331 |
| 8,224,333 B2* | 7/2012 | Pummill et al. | 455/445 |
| 8,400,961 B1* | 3/2013 | Islam et al. | 370/328 |
| 2002/0085516 A1* | 7/2002 | Bridgelall | 370/329 |
| 2003/0028612 A1* | 2/2003 | Lin et al. | 709/217 |
| 2003/0050062 A1* | 3/2003 | Chen et al. | 455/435 |
| 2004/0081086 A1* | 4/2004 | Hippelainen et al. | 370/227 |

OTHER PUBLICATIONS

3rd Generation Partnership Project—Technical Specification Group Service and System Aspects; Service requirements for Personal Network Management (PNM); Stage 1 (Release 8), 3GPP TS 22.259 V8.5.0 (Jun. 2008), V8.5.0, 3GPP, Whole document.

3rd Generation Partnership Project; Technical Specification Group Core Network and Terminals; Personal Network Management (PNM); Procedures and Information Flows; Stage 2 (Release 8), 3GPP TS 23.259 V8.1.0 (Jun. 2008), V8.1.0, 3GPP, Whole document.

3rd Generation Partnership Project; Technical Specification Group Core Network and Terminals; Personal Network Management (PNM); Stage 3 (Release 8), 3GPP TS 24.259 V0.5.0 (Apr. 2008), V0.5.0, 3GPP, Whole document.

International Search Report—PCT/JP2009/062157—Aug. 4, 2009.

Chinese Official Action—200980130598.3—Mar. 11, 2013.

Terminology alignment with CTI, S1-071657, 3GPP TSG-SA WG1 Meeting #38, Vodafone, Ljubljana, Slovenia, Oct. 29-Nov. 2, 2007.

* cited by examiner

METHOD FOR PERSONAL NETWORK SERVICE CONFIGURATION AND SYSTEM FOR PERSONAL NETWORK SERVICE CONFIGURATION

TECHNICAL FIELD

The present invention relates to telecommunication field and concerns a method for enabling Service configuration by at least two Personal Network Entities PNE in a Personal Network comprising a PN Application Server (AS) accessible via the IP Multimedia Subsystem domain, a primary PNE holding a subscription to control the Personal Network and a plurality of secondary Personal Network Entities PNE controlled by the primary PNE.

The invention concerns also a system for implementing the method.

BACKGROUND ART

In recent years, Personal Network Management system is defined by 3GPP (TS 22.259, 23.259, 24.259) as a home network-based application and network management aimed at providing configuration functions of a User's Personal Network (PN) and at managing access to Users' Personal Network Element (PNE). This system involves an Application Server (PNM AS) in the Network for enabling a user to perform some operations like registration, de-registration, configuration, de-configuration and Query Procedures (e.g. the Application Server may request the legitimate user, i.e. the controller of the PN, to grant service redirection).

One of the Personal Network Management applications is the Personal Network access Control (PN Access Control) that allows a Personal Network user (PN-User) to configure a Personal Network Access Control List for each User Equipment (UE) connected to the Personal Network. This PN-User is referred to as the Controller and identified by the private user identity, the public user identity, and the Controller service profile. Other UE are referred to "Controlled UE".

Figure 1:
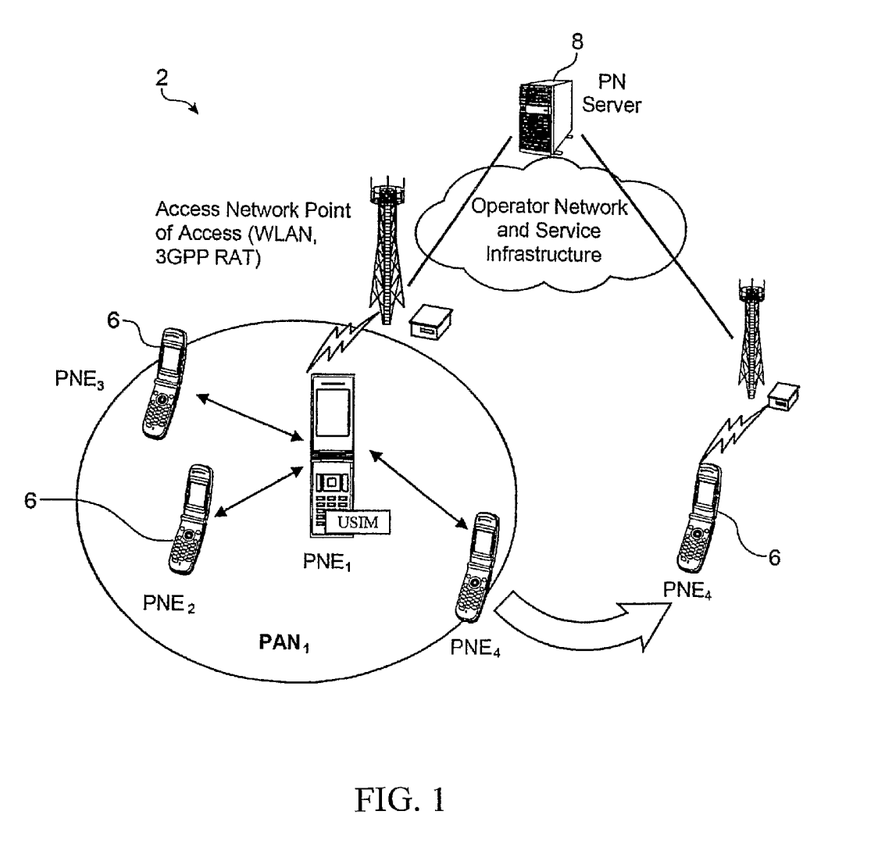
FIG. 1 illustrates a Personal Network overview.

FIG. 1 illustrates a Personal Network (PN) 2 comprising a primary Personal Network Entity PNE 4 equipped with a USIM, secondary PNE 6 controlled by the primary PNE 4, and a PN Application Server (AS) 8 accessible via the IP Multimedia Subsystem domain. The PNE 4 can configure the Service for all the PNE of the PN 2. The configuration may consist of a Session Redirection Service or Service Access limitation for example. The Controlees PNE may belong to the same Personal Network Area (PNA) 8 or not. Such PNA connects devices in short range wired or wireless connection. It can be a local Wi-Fi network, a local UWB Network, or local Bluetooth network for instance.

According to 3GPP PNM specifications, there is only one IMS subscription related to a PN, and there is only one Universal Subscription Identity Module (USIM) associated to a controller service profile. Besides the UE that holds this USIM can configure services for several Personal devices of the PN.

Furthermore, it should be noted that in related art described in 3GPP PNM specifications, a bootstrapping procedure is required prior to send a PN configuration request. So only the PNE which holds the subscription (USIM) to control the PN can send configuration requests thus preventing others PNE to perform PN configuration.

Besides, since the 3GPP Personal Network may register several UEs belonging to different users, the PN owner has to manage all users' preferences. Such settings can change dynamically in the time which may depend on the context of the UE (its environment, its current status or the user's preferences, . . . ). So this is obviously not convenient for the user because the PN configuration task becomes more complicated when PN includes more and more devices and/or when the PN comprises more and more service configurations that may be different from a user to another or from a device to another (example of configuration include session redirection and private network service as required in [0] or other configurations related to service delivery depending on the UE's context, etcetera).

It is to be noted that 3GPP specification specifies that "The user should feel in control over the system and be able to make it his or her personal appliance—an aspect that is closely related to user experience and personalization. This involves personal user profiles and adaptive intelligent agents, with focus on efficiency in terms of usability goals."

However, no unit exists to ensure that the user can control his PN whatever the device he uses and whatever the USIM he uses, more particularly when the control is linked to a subscription and if such subscription is physically hosted on a SIM of a device.

An object of the invention is to move the PN configuration control from a device to another.

DISCLOSURE OF INVENTION

The object of the invention is achieved by a method for enabling Service configuration by a plurality of Personal Network Entities PNE connected to a Personal Network comprising a PN Application Server (AS) accessible via the IP Multimedia Subsystem domain, a primary PNE holding a subscription to control the Personal Network and a plurality of secondary PNE controlled by the primary PNE.

The method according to the invention comprises the following steps:
- associating to each PNE configuration rights describing the services to be configured by each of the PNE,
- storing the PNE identities, and configuration rights associated to each PNE in a Configuration Element (PN-RCE),
- sending to the PN Application Server (AS) a configuration request based on the stored configuration rights.

Thanks to the invention, a user equipped with many UEs may choose any one of these UEs controlling the Personal Network configuration. The user, for example, configures his Personal Network (PN) at home using his home mobile phone whereas he would like to keep control of his PN while moving outside using his preferred PDA. Therefore the control of the PN can be moved from his home mobile phone to his PDA.

In a second example, the user may set limited PN configuration rights (i.e. While using another device that does not hold the legitimate USIM the user can still perform some PN configuration).

Yet in another example, the user can grant limited service control rights to other members of the PN. In this case, one member of a family could be able to block undesired terminated calls or redirect them to another person of the PN.

In a first exemplary embodiment of the method according to the invention, every PN configuration request issued by anyone of the PNE terminates at the primary PNE which checks the PNRCE and sends the desired PN configuration request to the PN Application Server (AS) on behalf of the originated PNE.

In this exemplary embodiment, the PNRCE is firstly configured and every PN configuration request issued by anyone of the PNEs of the PN terminates at the primary PNE. The later checks the PNRCE and sends the desired PN configuration request to the PN Server on behalf of the originated PNE.

Therefore the configuration messages are exchanged in an ad-hoc fashion between the primary device and the other PNEs of the PN. The primary device can still perform Configuration request on its own.

In a second exemplary embodiment of the method according to the invention, every PN configuration request issued by anyone of the PNEs connected to the PN is sent to the PN Application Server (AS) directly by the originated PNE.

In this exemplary embodiment the PNRCE is configured by the primary PNE and Configuration request sent either by the primary PNE or any Secondary PNE are received by the PN Server which checks the PN Rights in the PRNCE.

It is to be noted that the primary PNE is a device that has all privileges to modify the PNRCE such as a Customer Network Devices, a Home Gateway device, or Internet Gateway, and secondary PNEs are devices different from the primary PNE.

The method according to the invention is implemented in a system for enabling Service configuration by a plurality of Personal Network Entities PNE connected to a PN Application Server (AS) accessible via the IP Multimedia Subsystem domain, the system comprising a primary PNE holding a subscription to control the Personal Network and a plurality of secondary Personal Network Entities PNEs controlled by the primary PNE, the system comprising:

unit associating to each PNE configuration rights describing the services to be configured by each of the PNE, unit storing the PNE identities and configuration rights associated to each PNE in a Configuration Element PNRCE, unit sending to the PN Application Server (AS) a configuration request based on the stored configuration rights.

The primary PNE may be a UE that holds the USIM to which is associated a Controller Service Profile.

In a first architecture of the system according to the invention, the PNRCE is implemented in the primary PNE.

In a second architecture of the system according to the invention, the PNRCE is hosted on the PN Server.

BRIEF DESCRIPTION OF THE DRAWINGS

Other features and advantages of the invention will appear from the following description taken as a non limiting example with reference to the following drawings in which.

BEST MODE FOR CARRYING OUT THE INVENTION

For the purpose of clarity of the following description, identical features and steps in the drawings illustrating the related and those illustrating the present invention will be given the same reference numbers.

In the following description, "PN 2" designates the Personal Network 2, "PPNE 4" designates the primary Personal Network entity 4, "SPNE 6" designates the secondary Personal Network entities 6, "PNAS 8" designates the Personal Network Application Server 8, and "PNRCE 10" designates the Personal Network Application Server 10.

Figure 2:
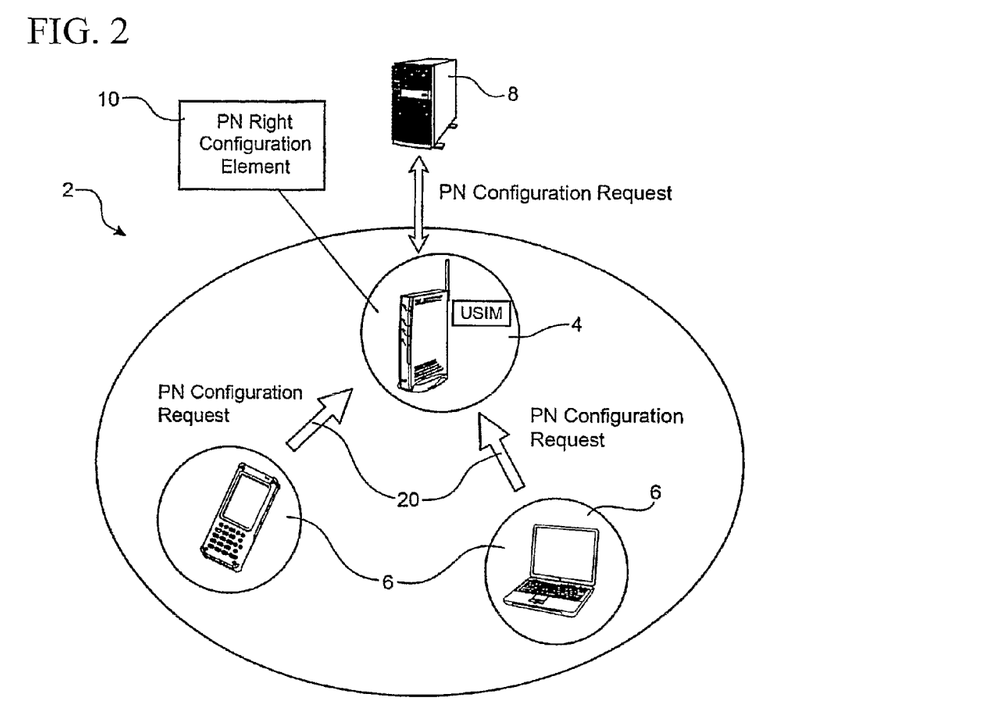
FIG. 2 schematically describes architecture for implementing a first exemplary embodiment of the method according to the invention.

The architecture illustrated in FIG. 2 comprises a PPNE 4, two SPNE 6, a PNAS 8, and a PNRCE 10.

In this architecture, the PPNE 4 may be a mobile phone, a PDA, a home gateway or a corporate gateway deserving multiple fixed or wireless devices, capable of receiving multiple messages and of interacting with the PNAS 8.

The PPNE 4 is an entity that has <<root>> privileges so it is the only one that can configure the rights for each SPNE 6 of the PN 2 in the PNRCE 10.

The PPNE 4 can be connected via a wired link therefore enabling a user to modify the PNRCE 10 from a PC (Personal Computer) via, e.g., a web Interface. In this latter case the PPNR 4 holds a web server.

The PNRCE 10 can be in any form of data structure.

Figure 3:
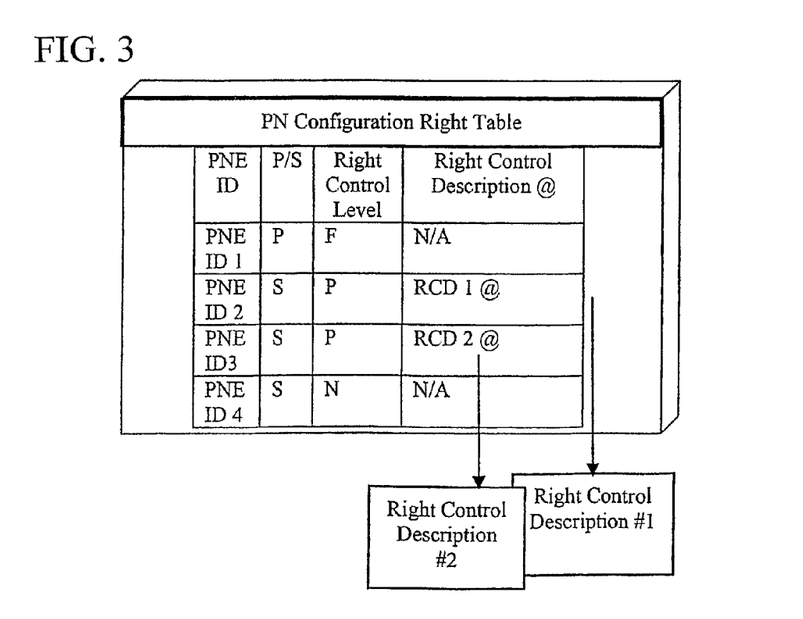
FIG. 3 illustrates a preferred exemplary embodiment of the invention in which the PNRCE is implemented as a table, FIG. 4 schematically describes architecture for implementing a second exemplary embodiment of the method according to the invention, FIG. 5 describes a preferred implementation of the invention by means a Home Gateway (HGW) with PNCRE management.

FIG. 3 illustrates a preferred exemplary embodiment of the invention in which the PNRCE 10 is implemented as a table comprising:

PNE ID that identifies a PNE of the PN,

P/S parameter that identifies whether a PNE is a primary or a secondary device

Right control level parameter that identify the level of rights (Full, Partial, None)

Right Control Description address comprising a reference to a Right Control description specifying what a PNE is allowed to configure in term of Service (e.g. call redirection).

The table further comprises the SPNEs identifiers of a given PN and information about the PN Configuration rights and status for each SPNE 6. It is to be noted that a PN can be identified using e.g. a URI so there can be several Personal Network and therefore several PN Configuration Right Tables.

The table includes for each SPNE 6 of the PN a PNE Type Indication (P/S) to indicate whether it is a primary or a secondary PNE:

The PPNE 4 is the one that holds the USIM and therefore the subscription associated with the PN Service, An SPNE 6 is a PNE that is registered in the PN under the control of the PPNE 4.

Only one PPNE 4 can have Full control at one moment in time to avoid conflicts between PNE configuration requests.

Also, the Table includes for each PNE of the PN a Controller Status that can have the following values {N; F; P}.

"N" means that No Control is set for the PNE. Therefore any PN configuration Requests from a PNE which has Controller Status set to "N" will be rejected.

"F" means that Full control is set for the PNE. Generally this is only affected to the PNE Controller having the USIM (e.g. primary PNE) for which is associated the PN with the subscription (PPNE). However the PPNE 4 may delegate the full control to an SPNE 6 but can at any time get back the full control. Therefore an SPNE 6 may be delegated full PN control until PPNE 4 requests full control back or until SPNE 6 release his control.

"P" means that Partial control is set for the associated PNE. The Primary PNE is allowed to provide some control rights for a set of PNE of the PN.

Finally, the Table includes for each PNE of the PN a reference to a Right Control Description (RCD) in case that the associated PNE has partial control. The PNE IDs are from the PN Access Control List.

In another implementation, the PNRCE 10 can be, a list, a tri-dimensional matrix, an XML document, comprising for each PNE zero or one PN Control Right Description that describes the service control logic of the PN.

An RCD describes what a PNE is allowed to configure in term of Services in the personal network. It can be in the form of an XML file because it is a flexible format easy to read and understand. The services and associated restrictions are stored in the file.

An example of RCD is given below

```
<?xml version="1.0" encoding="utf-8"?>
<PN_Right Control Description>
    <service id="session_redirection">
        <pn_user_id>        sip:PN_user1_private@home.org
    <pn_user_id>
        <pn_user_id>        sip:PN_user2_public@home.org
    <pn_user_id>
        <pn_user_id>        sip:PN_user3_public@home.org
    <pn_user_id>
    </service>
</PN_Right Control Description>
```

The PNE is identified by a private user identity which is derived from the IMSI stored in the USIM. The PNE to which is associated the RCD according to previous example will be able to configure the session redirection service, more particularly it will be allowed to configure the redirection of service for any terminated calls to three possible PN users identified by their private or public SIP URI (sip:PN_user1_private@home.org or sip:PN_user2_public@home.org or sip:PN_user3_public@home.org).

When a PN configuration request is issued from the PNE identified by its private user ID, the RCD is analyzed to check whether the PNE is authorized to perform the configuration requested. For instance the configuration is allowed if it consists of redirecting the session to a public user IDI which is associated to private user ID1 (sip:PN_user1_private@home.org).

It will be noted that both public and private user ID can be set for the session redirection service. When a private user ID is indicated the session redirection applies to all public user id associated to it.

In the exemplary embodiment of the invention illustrated by FIG. 2, the PNRCE 10 is implemented in the PPNR 4 which receives PN configuration requests from the SPNR 6 (arrows 20), compares the contents of incoming PN configuration requests to the configuration rights associated to each SPNE 6 previously stored in the PNRCE 10, and forwards the incoming PN configuration requests (arrow 24) to the PNAS 8 on behalf of the SPNE 6.

Furthermore, the PPNE 4 hides the real identities of the SPNE 6 to the PNAS 8 in order to avoid each of the SPNE 6 to perform an authorization or authentication procedure that may be refused by the PNAS 8 thus rejecting any further configuration request of the non-authorized PNE.

In a second exemplary embodiment of the invention illustrated by FIG. 3, the PNRCE 10 is implemented in the PNAS 8. In this case, the PNAS 8 receives PN configuration requests directly from the SPNR 6 (arrows 30), compares the contents of incoming PN configuration requests to the configuration rights associated to each SPNE 6 previously stored in the PNRCE 10 to ascertain whether the requested PN configurations are allowed or not.

If the requested PN configurations are compliant with the configuration rights associated to the SPNE 6, the PPNE 4 allows each SPNE 6 to configure the PN according to the rights previously stored in the PNRCE 10.

Figure 4:
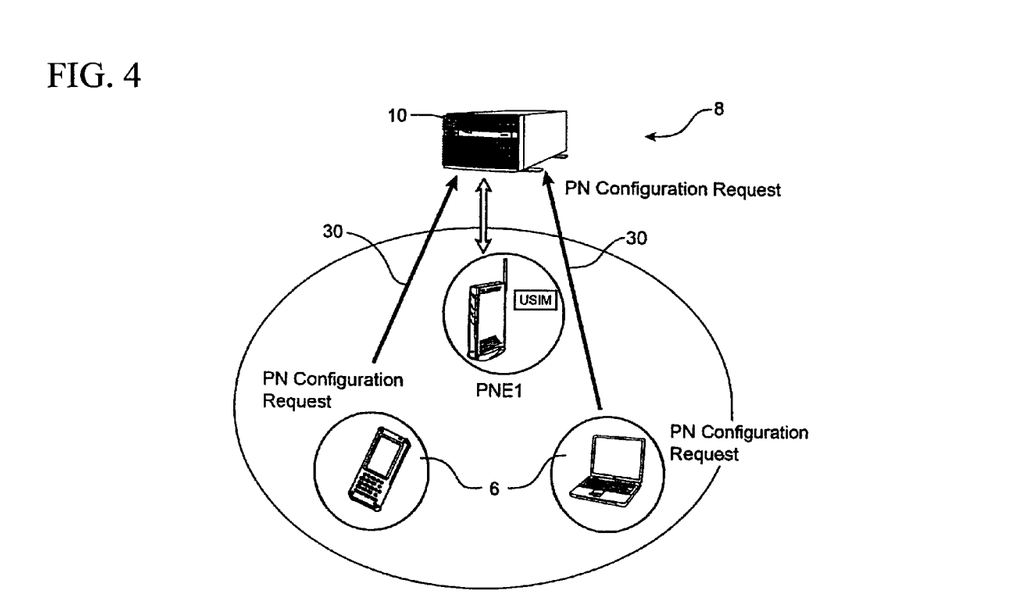

It is to be noted that the PNRCE 10 can be in an independent server and both configuration of FIG. 2 and FIG. 4 can be used.

There can be only one PNE with Full PN configuration rights to avoid configuration conflicts.

In both exemplary embodiments, the PPNE 4 has Full PN configuration rights unless it has transferred this right to another device. Having the full configuration rights the PPNE 4 can configure the PN such as modifying session redirection, registering PNE, or activating Private Network Service.

An SPNE 6 may have full, partial or no rights. An example of partial rights is a PNE able to configure the services for itself. For Service Redirection purpose, the PNE may be restricted to redirect a service to a limited set of devices.

If PPNE 4 transfer full right to an. SPNE 6, the PPNE 4 is be able to retrieve back the control whether the SPNE 6 agrees or not.

In order for the SPNEs 6 to know what they can configure in the PN they belong to, each of them is notified e.g. by the PPNE 4 a message including a description of what it is allowed to configure in the PN it belongs to.

The information can be presented in a Web format on the UE. Such presentation may have been transformed from an XML document that was sent in the notification message by the PPNE 4.

In a first exemplary embodiment, the notification is sent over a very short range wireless such as NFC.

In a second exemplary embodiment, the notification is sent wirelessly (e.g. Wi-Fi or Bluetooth).

In another exemplary embodiment the notification is sent over the network to the remote end that may not be in closed proximity.

Advantageously, the PPNE 4 expects to receive an acknowledgment to ensure that the SPNE 6 has received the notification information.

Figure 5:
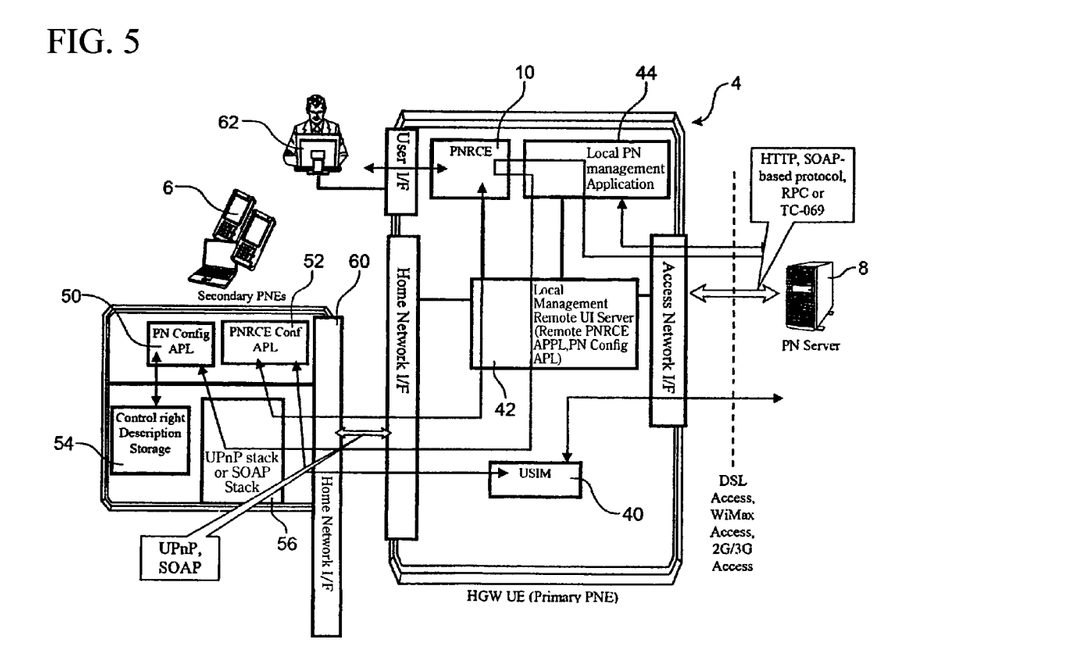

FIG. 5 is illustrates a system in which is implemented the method according to the invention.

This system comprises a PPNE 4 acting as Home Gateway, SPNEs 6, a PNAS 8, a PNRCE 10 hosted by the PPNE 4.

The PPNE 4 may be a set top box or a Mobile UE identified by a private user identity which is derived from the IMSI stored in the USIM 40 and includes a local Management Remote UI Server 42 (LMRUIS), a local PN Management Application 44.

The SPNE 6 includes a PN Configuration application 50, a PNRCE Configuration application 52, a Control right Description storage 54, a UPnP (for Universal Plug and Play) stack or SOAP (for Simple Object Access Protocol) stack 56.

The PPNE 4 communicates with the SPNN 6 via a Home Network interface 60 using either SOAP protocol or UPnP protocol.

The PNAS 8 is PN Application Server accessible via the IP Multimedia Subsystem domain that has SCSCF (Serving-Call Session Control Function) configured to redirect relevant SIP (Session Initiation Protocol) messages to the PNAS 8. PN configuration requests are sent from HGW to PNAS 10.

The PNRCE 10 is configured at the HOW 4 using a Man Machine Interface connected at the HGW 4. This may be done via a PC 62 connected via Ethernet OF or wireless interface with authentication or authorization required to modify the PNRCE 10.

The HGW 4 holds the PNRCE 10 and can send PN configuration requests on behalf of any of the SPNEs 6. Each registered SPNE 6 at the HGW 4 must be registered at the PN to avoid an SPNE 6 configuring a PN service that may correctly applies.

Optionally the HGW 4 allows an SPNE 6 to modify the PNRCE 10 temporarily by providing credentials over a NFC Communication Link. Such Credential is delivered if the SPNE 6 Identity is authorized in the USIM 40 of the HGW 40.

Once the configuration Rights are set for each SPNE 6, those SPNEs 6 are notified of such configuration via a message including a <<well defined>> description of what the PNE is allowed to configure in the PN. By making use of such description, each SPNE 6 can wirelessly and remotely perform a PN configuration request on the range of their PN configuration rights.

Those requests are sent to the PPNE 4 (i.e. the HGW) of the PN they belong to. The requests can be in the form of HTTP request or can be XML formatted. There can also be formatted so to access UPnP service in the HGW through a web server.

As specified in HGI Technical Requirements of the 3GPP group, the HOW 4 can discover and uniquely identify the Managed/Unmanaged/Manageable/Unmanageable device.

Therefore a PNE can be a device managed by the HGW 4. The PN Control Management between the HGW 4 and the controlled devices SPNEs 6 can be done via UPnP protocol. The PN Control Management between the HGW 4 and the PN Server 8 can be done using either HTTP Push Messages or TR-069 protocol [see DSL Forum TR-069 "CPE WAN Management Protocol", May 2004], a DSL Forum Technical specification for remote management of end-user devices (as shown in FIG. 3).

For configuring the PNRCE 10 and/or for sending PN configuration request, the HGW 4 may implement a Remote UI Server Device UPnP service extended for PN purpose (local management UI Server 42). The HGW 4 could also define a Web based Service deployed in each SPNE 6 client.

Upon reception of a PN configuration request from an SPNE 6, the HGW 4 analyzes its PNRCE 10 and ascertains whether to send a PN configuration Request to the PNAS 8 including the configuration settings of the original request. The original request may be refused for some reason (operation is not authorized, etc. . . . ). The HWG 4 needs to know the PN Services that can be configured and how they can be configured.

Figure 6:
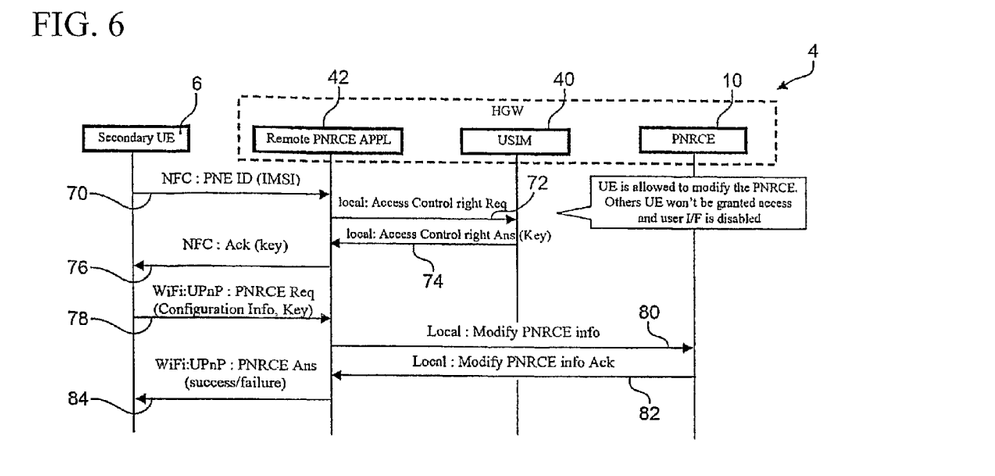
FIG. 6 describes a flow chart illustrating the configuration of the PNRCE in the HGW by a UE acting as an SPNE according to the invention.

FIG. 6 is flow chart illustrating the configuration of the PNRCE 10 in the HGW 4 by a UE acting as an SPNE 6.

This configuration can be done in the following manner:

At step 70, The UE 6 touches the HGW 4 on the NFC logo indication and provides his PNE identity information (e.g. this can be IMSI information) to the Remote PNRCE Application 42;

At step 72 the Remote PNRCE Application 42 sends a request the USIM 40 to checks whether the UE 6 is allowed to configure the PNRCE 10 or not;

If the UE 6 is allowed:

The HGW 4 computes a secret key for the UE, and return (step 74) the key to the Remote PRNCE Application 42.

At step 76, the Remote PRNCE Application 42 sends an Acknowledgement message to the UE 6;

At step 78, the UE 6 returns Configuration information to the Remote PRNCE Application 42 along with the secret key, at step 80, the Remote PRNCE Application 42 sends to the PNRCE 10 a message to modify the PNRCE information, At step 82, the PNRCE 10 returns to the Remote PRNCE Application 42 Acknowledgement message. The user can then configure the PNRCE 10 wirelessly on his UE 6 and the secret key is given with the PNRCE configuration information.

If the UE is not allowed, at step 84, then HGW 4 return to the UE 6 a failure response with potential reason.

Alternatively the HGW 4 does not compute a secret key but make a local association by associating the UE session (e.g. the UE IP address or the UE unique identifier) with the right to modify the PNRCE 10. There should be only one UE having PNRCE access at a time.

Figure 7:
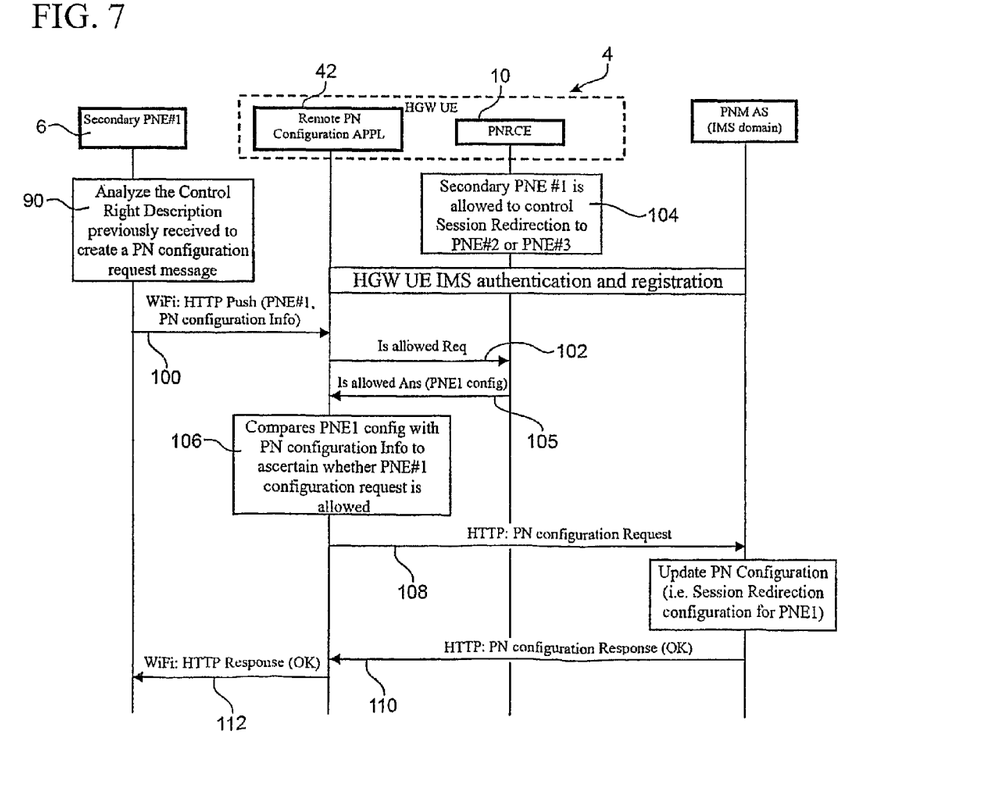
FIG. 7 describes a flow chart illustrating the configuration of the PNRCE from a secondary PNE via HGW UE according to the invention.

FIG. 7 is a flow chart illustrating a PN configuration from an SPNE via HGW UE.

The SPNE 6 can only configure the PN, with full or limited rights, if the PPNE 4, or its delegate, has configured the description rights in the PNRCE 10.

The SPNE 6 will be able to send appropriate PN configuration request if it has knowledge of his PN configuration rights. Therefore it has previously received a Control right Description which can be in the form of an XML document. The document describes all the PNE is allowed to configure thus preventing from repetitive configuration failure at the HGW.

As shown in the FIG. 7 the SPNE 6 has a Control Right Description 90 and creates a PN configuration Request based on the right description.

At step 100, the request is sent to the Remote PN Configuration application (RPNCApp) 42 on a known port, i.e., the port related to the web service deployed. The request includes the SPNE 6 Identifier and PN Configuration information.

At step 102 the RPNCApp 42 sends to the PNRCE 10 a request to check whether the PN Configuration requested by SPNE 6 is authorized by the Control Right Description stored in the PNRCE 10;

At step 104, the HGW analyses the message and retrieve the Control Right Description from the PNRCE 10.

At step 105, the PNRCE 10 sends to the RPNCApp 42 the result of the analysis performed at step 104.

At step 106, the RPNCApp 42 compares the Configuration requested with the PN Configuration information previously stored to ascertain whether the requested configuration is allowed or not;

If the HGW determines that the request is allowed, so it sends (step 108) a PN configuration request to the PNMAS 8 on behalf of the SPNE 6. For instance, in 3GPP PN, this can be a HTTP request comprising the configuration information. The configuration is then performed by the PNMAS 8 and, at step 110, a response is sent back to the HGW 4 acting as a User Equipment.

At step 112, the HGW UE 4 forwards the answer to the SPNE 6.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from European patent application No. EP08164679.6, filed on Sep. 19, 2008, the disclosure of which is incorporated herein in its entirety by reference.

INDUSTRIAL APPLICABILITY

The object of the invention is achieved by a method for enabling Service configuration by a plurality of Personal Network Entities PNE connected to a Personal Network comprising a PN Application Server (AS) accessible via the IP Multimedia Subsystem domain, a primary PNE holding a subscription to control the Personal Network and a plurality of secondary PNE controlled by the primary PNE.

The invention claimed is:

1. A method for personal network service configuration enabling Service configuration by a plurality of Personal Network Entities connected to a Personal Network comprising a Personal Network Application Server accessible via IP Multimedia Subsystem domain, a primary Personal Network Entity holding a subscription to control the Personal Network and a plurality of secondary Personal Network Entities controlled by the primary Personal Network Entity, comprising:
    associating configuration rights to each Personal Network Entity describing which specific services each of the Personal Network Entities is permitted to configure in the Personal Network;
    storing identities of each of the Personal Network Entities and the configuration rights describing the specific services that each of the Personal Network Entities is permitted to configure in the Personal Network, the configuration rights being associated to each of the Personal Network Entities in a Personal Network Right Configuration Element (PNRCE);
    comparing a configuration request issued by any one of the Personal Network Entities with the configuration rights stored in the PNRCE for one of the Personal Network Entities having sent the configuration request, the configuration request being a request for the one Personal Network Entity having sent the configuration request to configure one or more specific services in the Personal Network, the configuration request being compared with the stored configuration rights to determine whether the one or more specific services indicated by the configuration request corresponds with at least one of the specific services the one Personal Network Entity is permitted to configure; and
    sending the configuration request to the Personal Network Application Server when the configuration request is compliant with one or more of the configuration rights stored in the PNRCE for the one Personal Network Entity having sent the configuration request,
    wherein the specific services that each of the Personal Network Entities is permitted to configure in the Personal Network and the specific services indicated by the configuration request from the one Personal Network Entity comprise one or more of redirection of services for one or a set of the Personal Network Entities, modifying session redirection, registering one of the Personal Network Entities in the Personal Network, and activating Private Network Service.

2. The method for personal network service configuration according to claim 1, wherein every Personal Network configuration request issued by any one of the Personal Network Entities terminates at the primary Personal Network Entity which checks the PNRCE and sends the desired Personal Network configuration request to the Personal Network Application Server on behalf of the originated Personal Network Entity.

3. The method for personal network service configuration according to claim 1, wherein any Personal Network configuration request issued by any one of the Personal Network Entities is directly sent to the Personal Network Application Server by the originated Personal Network Entity.

4. The method for personal network service configuration according to claim 2, wherein the primary Personal Network Entity is a device that has all privileges to modify the PNRCE such as a Customer Network Device, a Home Gateway device, or an Internet Gateway.

5. The method for personal network service configuration according to claim 4, wherein the Personal Network Entities are secondary devices of the Personal Network different from the primary Personal Network Entity.

6. The method for personal network service configuration according to claim 4, wherein the primary Personal Network Entity is a user equipment that holds a Universal Subscription Identity Module to which is associated a Controller Service Profile.

7. The method for personal network service configuration according to claim 4, wherein the PNRCE is stored in the primary Personal Network Entity.

8. The method for personal network service configuration according to claim 4, wherein the PNRCE is hosted on the Personal Network Application Server.

9. The method for personal network service configuration according to claim 4, wherein the PNRCE is a server independent from the primary Personal Network Entity and from the secondary Personal Network Entity.

10. A system for personal network service configuration enabling Service configuration by a plurality of Personal Network Entities connected to a Personal Network comprising a Personal Network Application Server accessible via IP Multimedia Subsystem domain, a primary Personal Network Entity holding a subscription to control the Personal Network and a plurality of secondary Personal Network Entities controlled by the primary Personal Network Entity, comprising:
    a processing device;
    an associating unit that associates configuration rights to each Personal Network Entity describing which specific services each of the Personal Network Entities is permitted to configure in the Personal Network;
    a storing unit that stores identities of each of the Personal Network Entities and the configuration rights describing the specific services that each Personal Network Entity is permitted to configure in the Personal Network, the configuration rights being associated to each of the Personal Network Entities in a Personal Network Right Configuration Element (PNRCE);
    a comparing unit configured to compare a configuration request issued by any one of the Personal Network Entities with the configuration rights stored in the PNRCE for one of the Personal Network Entities having sent the configuration request, the configuration request being a request for the one Personal Network Entity having sent the configuration request to configure one or more specific services in the Personal Network, the configuration request being compared with the stored configuration rights to determine whether the one or more specific services indicated by the configuration request corresponds with at least one of the specific services the one Personal Network Entity is permitted to configure; and
    a sending unit configured to, when the configuration request is compliant with one or more of the configuration rights stored in the PNRCE for the one Personal Network Entity having sent the configuration request, send the configuration request to the Personal Network Application Server,
    wherein the processing device is configured to execute one or more of the associating unit, the storing unit, the comparing unit, and the sending unit to associate the configuration rights, store the identities, compare the configuration request with the configuration rights, and send the configuration request, respectively, and wherein the specific services that each of the Personal Network Entities is permitted to configure in the Personal Network and the specific services indicated by the configuration request from the one Personal Network Entity comprise one or more of redirection of services for one or a set of the Personal Network Entities, modifying session redirection, registering one of the Personal Network Entities in the Personal Network, and activating Private Network Service.

11. The method for personal network service configuration according to claim 3, wherein the primary Personal Network Entity is a device that has all privileges to modify the PNRCE such as a Customer Network Device, a Home Gateway device, or an Internet Gateway.

12. The method for personal network service configuration according to claim 11, wherein the Personal Network Entities are secondary devices of the Personal Network different from the primary Personal Network Entity.

13. The method for personal network service configuration according to claim 11, wherein the primary Personal Network Entity is a user equipment that holds a Universal Subscription Identity Module to which is associated a Controller Service Profile.

14. The method for personal network service configuration according to claim 11, wherein the PNRCE is stored in the primary Personal Network Entity.

15. The method for personal network service configuration according to claim 11, wherein the PNRCE is hosted on the Personal Network Application Server.

16. The method for personal network service configuration according to claim 11, wherein the PNRCE is a server independent from the primary Personal Network Entity and from the secondary Personal Network Entities.

17. The method for personal network service configuration according to claim 1, wherein after the configuration request is sent to the Personal Network Application Server when the configuration request is compliant with one or more configuration rights stored in the PNRCE, the Personal Network Entity having sent the configuration request is permitted to configure the Personal Network according to the one or more configuration rights stored in the PNRCE.

18. The system for personal network service configuration according to claim 10, wherein after the configuration request is sent to the Personal Network Application Server when the configuration request is compliant with one or more configuration rights stored in the PNRCE, the Personal Network Entity having sent the configuration request is permitted to configure the Personal Network according to the one or more configuration rights stored in the PNRCE.

19. A method for personal network service configuration enabling service configuration, the method comprising:
associating configuration rights to each of a plurality of personal network entities connected to a personal network, the configuration rights describing one or more services, from a plurality of services used to configure the personal network, that each of the personal network entities is permitted to configure in the personal network;
storing identities and one of a plurality of control levels for each of the personal network entities, each of the control levels indicating an amount of the one or more services that are permitted to be configured by each personal network entity;
identifying one of the personal network entities having sent a configuration request to configure one or more specific services in the personal network;
determining whether the identified personal network entity is permitted to configure the one or more specific services indicated by the configuration request based on the control level stored for the identified personal network entity; and
transmitting the configuration request to a personal network application server when it is determined that the identified personal network entity is permitted to configure the one or more specific services indicated by the configuration request,
wherein the specific services that each of the Personal Network Entities is permitted to configure in the Personal Network and the specific services indicated by the configuration request from the one Personal Network Entity comprise one or more of redirection of services for one or a set of the Personal Network Entities, modifying session redirection, registering one of the Personal Network Entities in the Personal Network, and activating Private Network Service.

20. The method according to claim 19, wherein the plurality of personal network entities includes one or more of a primary personal network entity holding a subscription to control the personal network and a plurality of secondary personal network entities controlled by the primary personal network entity.

* * * * *